(12) United States Patent
Hsu et al.

(10) Patent No.: US 10,886,829 B2
(45) Date of Patent: Jan. 5, 2021

(54) ELECTROMAGNETIC DRIVING MODULE AND LENS DEVICE USING THE SAME

(71) Applicant: TDK TAIWAN CORP., Yangmei Taoyuan (TW)

(72) Inventors: ShangYu Hsu, Yangmei Taoyuan (TW); Nai-Wen Hsu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 381 days.

(21) Appl. No.: 15/885,288

(22) Filed: Jan. 31, 2018

(65) Prior Publication Data

US 2018/0175714 A1 Jun. 21, 2018

Related U.S. Application Data

(63) Continuation of application No. 14/512,048, filed on Oct. 10, 2014, now Pat. No. 10,097,074.

(30) Foreign Application Priority Data

Nov. 29, 2013 (TW) .............................. 102143717 A (51) Int. Cl.
*H02K 35/02* (2006.01)
*G01J 1/04* (2006.01)
*G02B 7/10* (2006.01)
*H02K 41/035* (2006.01)

(52) U.S. Cl.
CPC ............ *H02K 35/02* (2013.01); *G01J 1/0403* (2013.01); *G01J 1/0448* (2013.01); *G02B 7/102* (2013.01); *H02K 41/0356* (2013.01)

(58) Field of Classification Search
CPC ... H02K 35/02; H02K 41/0356; G01J 1/0403; G01J 1/0448; G02B 7/102
See application file for complete search history.

(56) References Cited

U.S. PATENT DOCUMENTS

| 7,542,384 B2* | 6/2009 | Ke ........................ G11B 7/0932 369/44.15 |
| 2008/0246353 A1* | 10/2008 | Kuo ........................ G02B 7/102 310/14 |
| 2012/0081559 A1 | 4/2012 | Sato | |

FOREIGN PATENT DOCUMENTS

| TW | 201319612 A1 | 5/2013 |
| TW | 201341934 A | 10/2013 |

OTHER PUBLICATIONS

Taiwanese Office Action dated Mar. 6, 2015, as issued in corresponding Taiwan Patent Application No. 102143717 (4 pages).

* cited by examiner

*Primary Examiner* — Georgia Y Epps
*Assistant Examiner* — Don J Williams
(74) *Attorney, Agent, or Firm* — Muncy, Geissler, Olds & Lowe, P.C.

(57) ABSTRACT

The disclosure discloses an electromagnetic driving module which includes a base, two magnetic elements, a wiring assembly, a reference element, and a sensor element. The two magnetic elements are arranged along a reference line and positioned at two sides of the base. The wiring assembly is connected to the base and arranged adjacent to the two magnetic elements. The reference element is positioned on the base. The sensor element is adjacent to the reference elements and configured to detect the movement of the reference element to position the base. A lens device using the electromagnetic driving module is also disclosed.

11 Claims, 7 Drawing Sheets

ELECTROMAGNETIC DRIVING MODULE AND LENS DEVICE USING THE SAME

CROSS REFERENCE TO RELATED APPLICATIONS

This application is a Continuation of application Ser. No. 14/512,048, filed on Oct. 10, 2014, which claims the benefit of Taiwan Patent Application No. 102143717, filed on Nov. 29, 2013.

BACKGROUND OF THE DISCLOSURE

Field of the Disclosure

The present Disclosure relates to a driving module and a lens device using the same, and more particularly to an electromagnetic driving module which converts electrical energy into mechanical energy and a lens device using the same.

Description of the Related Art

Generally, an electronic device includes a driving module to drive an element to move a predetermined distance. For example, an electronic device having an image capturing function usually includes a driving module to generate driving power. One or more optical lens units of the electronic device are driven by the driving power to move along an optical axis, so as to facilitate auto-focus and auto-zoom controls.

However, since the driving module includes a complex driving member, such as step motor, ultrasonic motor, or piezoelectric actuators, etc. to generate the driving power and the driving power has to be transmitted by a number of transmission elements, it is not easy to assemble and the manufacturing cost is high. In addition, the conventional driving module is also large in size and has a high power consumption due to its complex construction.

Therefore, a driving module that has the advantages of small size and simple construction is desired by the manufacturers.

BRIEF SUMMARY OF THE DISCLOSURE

Accordingly, one objective of the present disclosure is to provide an electromagnetic driving module, which is configured to provide a driving force to drive an element such as a lens assembly positioned in the electromagnetic driving module to move.

According to some embodiments of the disclosure, the electromagnetic driving module includes a base, two first magnetic elements, a wiring assembly, a reference element, and a sensor element. The two first magnetic elements are arranged along a first reference line and disposed on two sides of the base. The wiring assembly is arranged adjacent to the two first magnetic elements and connected to the base. The wiring assembly is configured to allow an electric current to pass therethrough. The reference element is disposed on the base. The sensor element is arranged adjacent to the reference element. The sensor element is configured to detect the movement of the reference element to position the base.

In some embodiments, the electromagnetic driving module further includes two second magnetic elements. The two second magnetic elements are arranged along a second reference line and disposed on two sides of the base. At least a portion of the wiring assembly faces the two second magnetic elements.

In some embodiments, the first reference line and the second reference line are located on the same plane.

In some embodiments, the two first magnetic elements are point symmetric with respect to a substantially central portion of the base, and the two second magnetic elements are point symmetric with respect to the substantially central portion of the base.

In some embodiments, the wiring assembly includes two coils. Each of the two coils is respectively adjacent to one of the two first magnetic elements. Each of the two coils includes an upper portion and a lower portion electrically connected to the upper portion. In addition, each of the two first magnetic elements includes an upper magnetic pole adjacent to the upper portion and a lower magnetic pole adjacent to the lower portion. The upper magnetic pole and the lower magnetic pole have different magnetic properties.

In some embodiments, the electromagnetic driving module further includes a circuit board, and the sensor element is disposed on the circuit board. The wiring assembly is electrically connected to the circuit board and receives an electronic signal from the outside of the electromagnetic driving module via the circuit board.

In some embodiments, the sensor element includes a Hall effect sensor, and the reference element includes a permanent magnet.

Another objective of the present disclosure is to provide a lens device. The lens device includes any electromagnetic driving module in any of the embodiments mentioned above and a lens assembly disposed in the electromagnetic driving module. The electromagnetic driving module adjusts the position of the lens assembly to facilitate auto-focus and auto-zoom controls.

The electromagnetic driving module of the present disclosure is driven by a motive force provided by a magnetic element and a magnetic field provided by coils as a current passes through. Therefore, an element positioned in the electromagnetic driving module can be moved quickly to a desired position. Compared with a conventional driving module, the electromagnetic driving module of the present disclosure has the advantages of low power consumption, small size, high positioning precision, and low manufacturing cost.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

The making and using of the embodiments of the disclosure are discussed in detail below. It should be appreciated, however, that the embodiments can be embodied in a wide variety of specific contexts. The specific embodiments discussed are merely illustrative, and do not limit the scope of the disclosure.

Figure 1:
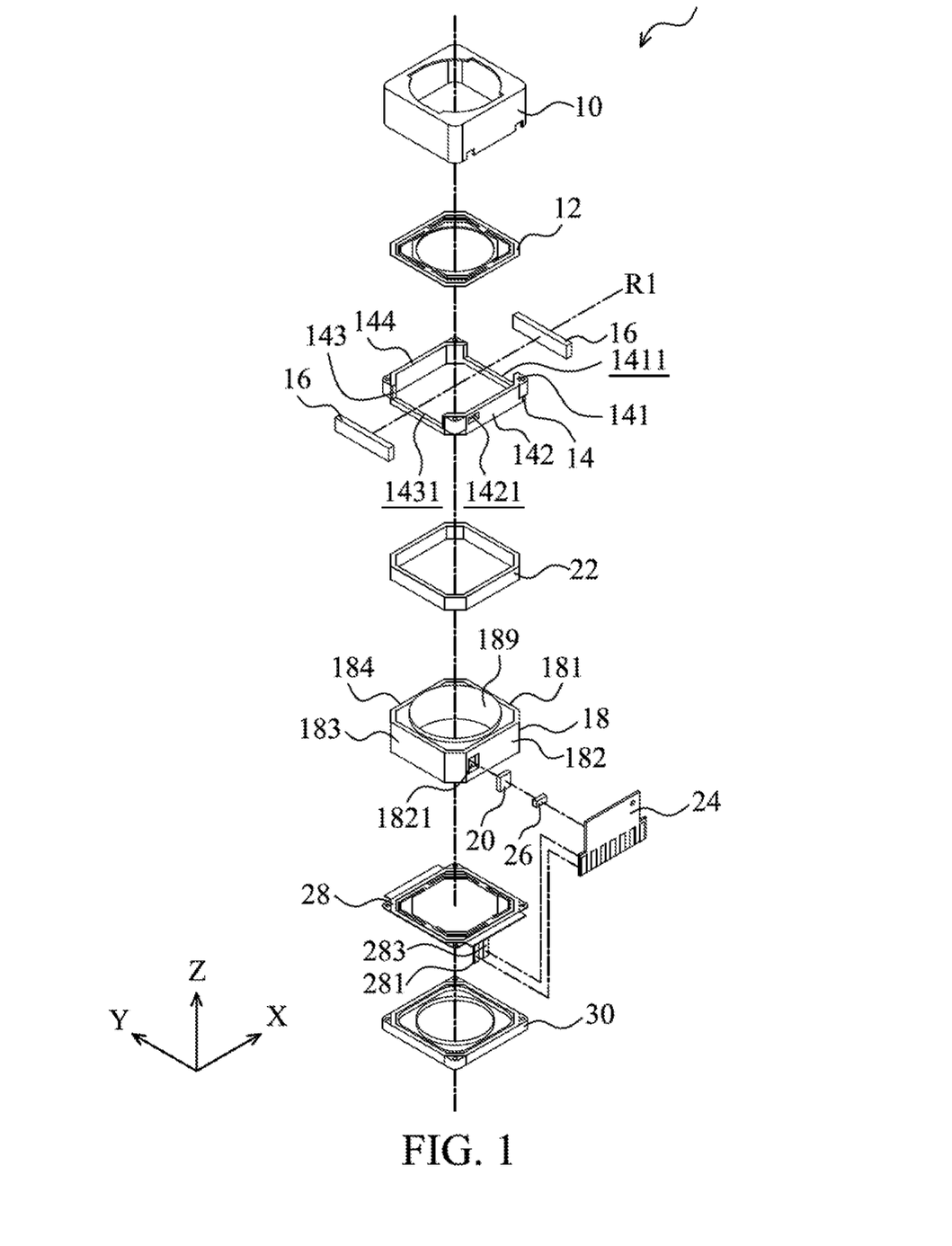
FIG. 1 shows an exploded view of an electromagnetic driving module, in accordance with some embodiments.

FIG. 1 shows an exploded view of an electromagnetic driving module 1, in accordance with some embodiments. In one embodiment, the electromagnetic driving module 1 is a voice coil motor (VCM) which includes an upper housing 10, an upper spring sheet 12, a frame 14, two first magnetic elements 16, a base 18, a reference element 20, a wiring assembly 22, a circuit board 24, a sensor element 26, a lower spring sheet 28, and a lower housing 30. The elements of the electromagnetic driving module 1 can be added to or omitted, and the disclosure should not be limited by the embodiment.

In one embodiment, the upper spring sheet 12 is fixed at the frame 14, and the lower spring sheet 28 is fixed at the lower housing 30. The upper spring sheet 12 and the lower spring sheet 28 are configured for supporting the base 18 and enabling the base 18 to move in a vertical direction (X-axis). The base 18 is disposed in an accommodation space (not indicated) defined by the upper housing 10 and the lower housing 30. In one embodiment, the lower spring sheet 28 includes two conductive pins 281 and 283, and the two conductive pins 281 and 283 are electrically connected to the circuit board 24.

In one embodiment, the base 18 is penetrated by a passage 189 and is configured to support an assembly, such as a lens assembly (not shown in FIG. 1). In addition, the base 18 includes one or more side surfaces surrounding the passage 189. In one embodiment, the base 18 includes a number of side surfaces, such as a first side surface 181, a second side surface 182, a third side surface 183, and a fourth side surface 184. The first side surface 181 is opposite to the third side surface 183, and the second side surface 182 is opposite to the fourth side surface 184. The wiring assembly 22 has a circular configuration and is disposed on the first, the second, the third, and the fourth side surfaces 181, 182, 183, and 184. The wiring assembly 22 is configured to allow an electric current passing therethrough to generate a magnetic field. In one embodiment, the wiring assembly 22 is electrically connected to the lower spring sheet 29. The electrical current from the outside power source is transmitted to the wiring assembly 22 via the circuit board 24 and the lower spring sheet 28.

In one embodiment, the frame 14 is fixed at the upper housing 10 or the lower housing 30 and is positioned between the upper spring sheet 12 and the lower spring sheet 28. The frame 14 includes one or more side sub-frames. In one embodiment, the frame 14 includes four sub-frames, such as a first sub-frame 141, a second sub-frame 142, a third sub-frame 143, and a fourth sub-frame 144. In one embodiment, the first sub-frame 141, a second sub-frame 142, a third sub-frame 143, and a fourth sub-frame 144 are respectively adjacent to the first side surface 181, a second side surface 182, a third side surface 183, and a fourth side surface 184 of the base 18. A gap is formed between the sub-frames of the frame 14 and the outer surfaces of the base 18. There is no contact between the frame 14 and the base 18.

In one embodiment, the first sub-frame 141 includes an opening 1411, and the third sub-frame 143, which is opposite to the first sub-frame 141, includes an opening 1431. The shape of each opening 1411 and 1431 corresponds to the shape of each first magnetic element 16. The two first magnetic elements 16 are respectively adjacent to wiring assembly 22 and disposed in the openings 1411 and 1431. Additionally, the second sub-frame 142 includes a through hole 1421 for receiving the sensor element 26.

Figure 2:
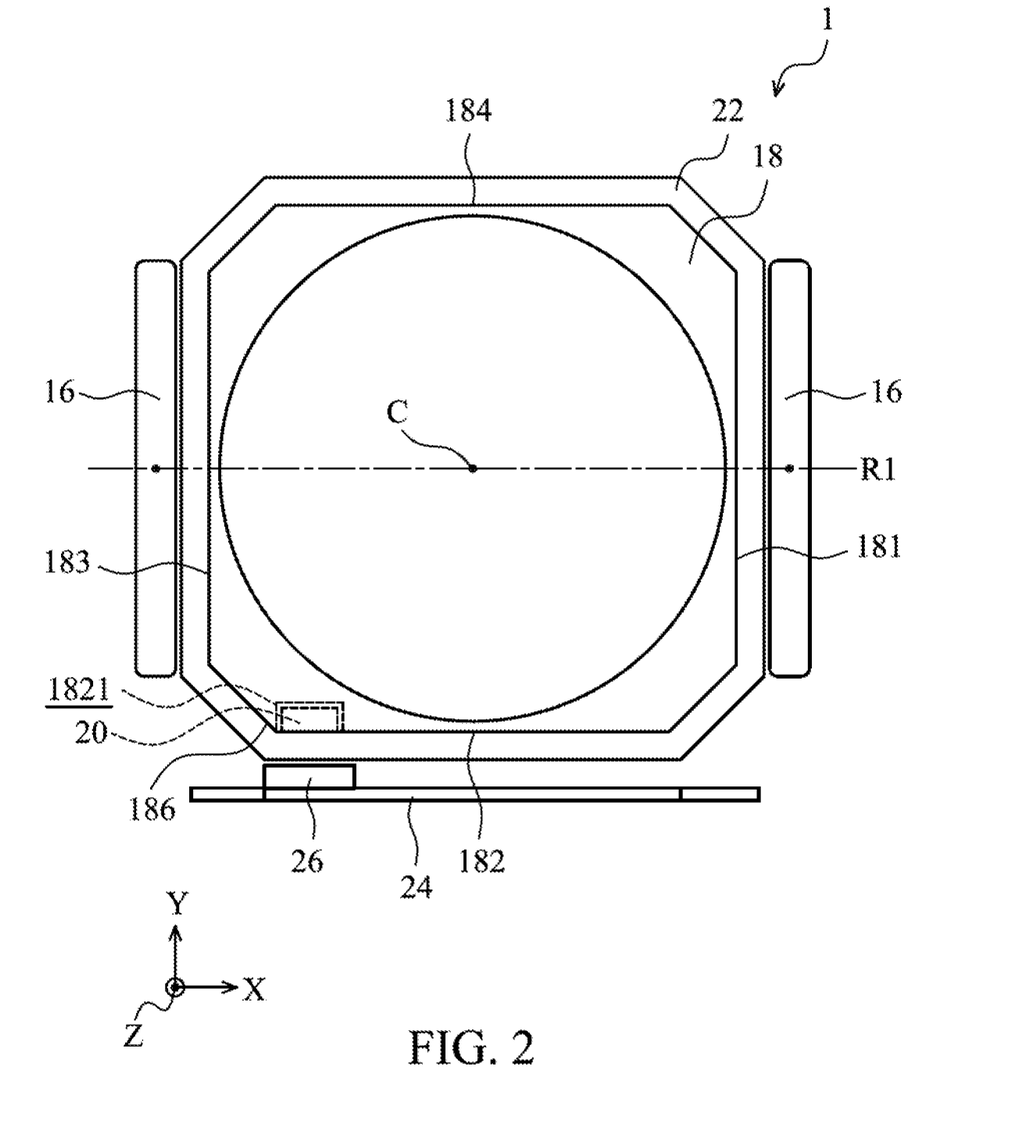
FIG. 2 shows a top view of a portion of an electromagnetic driving module, in accordance with some embodiments.

FIG. 2 shows a top view of the electromagnetic driving module 1, in accordance with some embodiments. The substantially central portion of each first magnetic element 16 is arranged along a first reference line R1. The first reference line R1 passes through the substantially central portion of the base 18 and is perpendicular to the first side surface 181 and the third side surface 183. Through the above-mentioned arrangements, the base 18 is stably driven to move along a vertical direction (Z-axis) by the magnetic field generated by the two first magnetic elements 16 and the magnetic field generated by the wiring assembly 22. Therefore, the control accuracy of the base 18 is improved. However, it should be appreciated that the position of the two first magnetic elements 16 should not be limited to the embodiment. The position of the two first magnetic elements 16 can be modified, as along as the base 18 can be stably driven by the magnetic force.

In one embodiment, at the vicinity of the corner 186 between the second side surface 182 and the third side surface 183, a groove 1821 is disposed on the second side surface 182. The reference element 20 is disposed in the groove 1821. The sensor element 26 is arranged adjacent to the reference element 20 to position the base 18. In the embodiment, the reference element 20 is a permanent magnet, and the sensor element 26 is a Hall effect sensor. By detecting the permanent magnet of the reference element 20, the sensor element 26 produces an electrical signal based on the position of the reference element 20, so that the position of the base 18 is measured. In another embodiment, the reference element 20 includes an optical transmitter, and the sensor element 26 includes a position signal receiver. By receiving the signal from the reference element 20, the sensor element 26 produces an electrical signal based on the position of the reference element 20, so that the position of the base 18 is measured.

In one embodiment, the circuit board 24 is arranged adjacent to the second side surface 182, and the sensor element 26 is disposed on the circuit board 24. In the other embodiment, the sensor element 26 is not directly disposed on the circuit board 24, and the sensor element 26 is electrically connected to the circuit board 24 via a conductive element. The circuit board 24 is electrically connected to an external circuit via an opening (not shown in the figure) between the upper housing 10 and the lower housing 30. In one embodiment, power or an electrical signal from the outside is transmitted to the elements in the electromagnetic driving module 1 via the circuit board 24, and the electrical signal produced by the sensor element 26 is transmitted to a control system (not shown in the figure) via the circuit board 24. The control system adjusts the electrical current applied to the wiring assembly 24 according to the electrical signal from the sensor element 26, so as to correct the position of the base 18.

Figure 3:
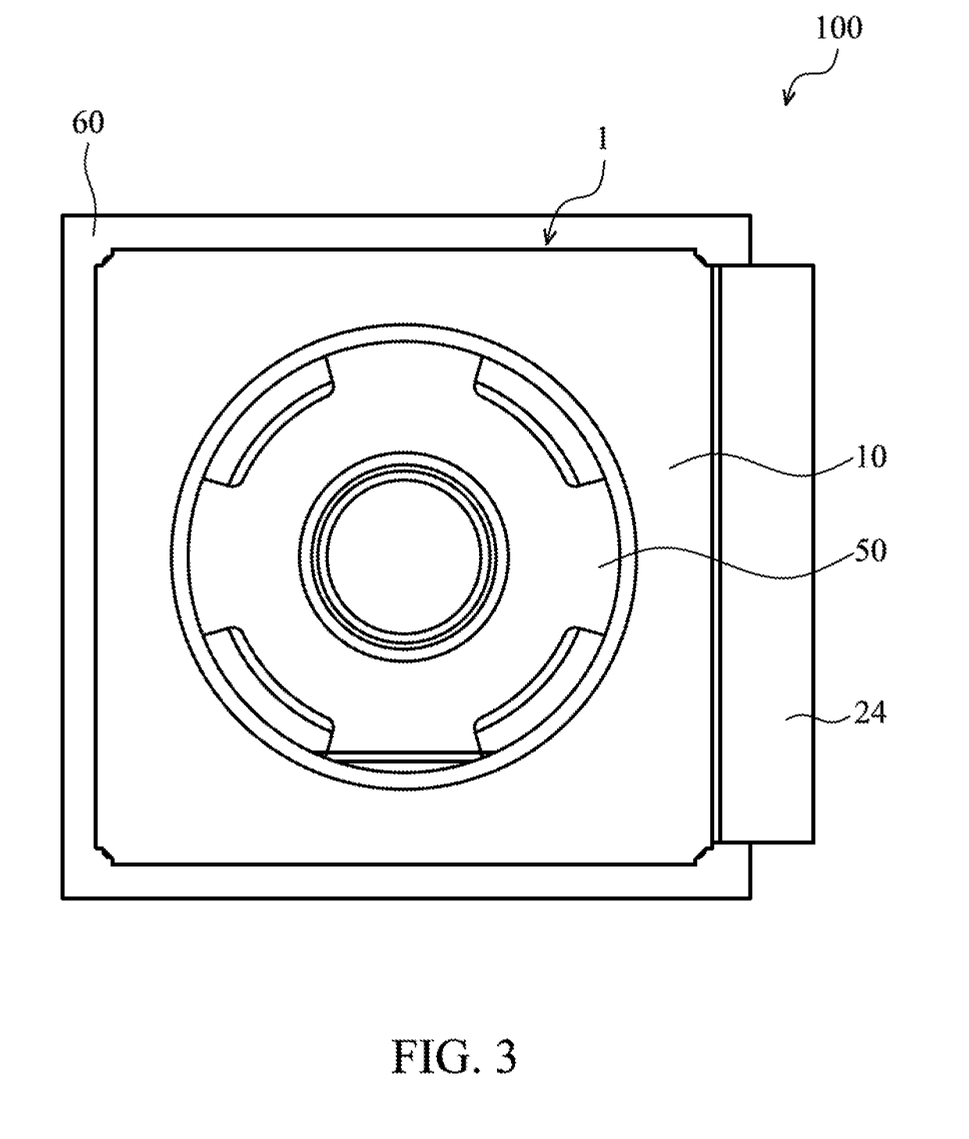
FIG. 3 shows a top view of a lens device including an electromagnetic driving module, in accordance with some embodiments.

FIG. 3 shows a top view of a lens device 100 including the electromagnetic driving module 1. In one embodiment, the lens device 100 includes an electromagnetic driving module 1, a lens assembly 50, and an optical sensor 60. The lens assembly 50 is disposed on the base 18 (FIG. 1) of the electromagnetic driving module 1. The light receiving side of the lens assembly 50 is adjacent to the upper housing 10, and the light emitting side of the lens assembly 50 is adjacent to the optical sensor 60. The optical sensor 60 is a CMOS sensor, for example. The optical sensor 60 receives light passing through the lens assembly 50 and produces an image signal. The electromagnetic driving module 1 controls the focal length between the lens assembly 50 and the optical sensor 60, so as to facilitate an auto-focus and an auto-zoom control.

Figure 4:
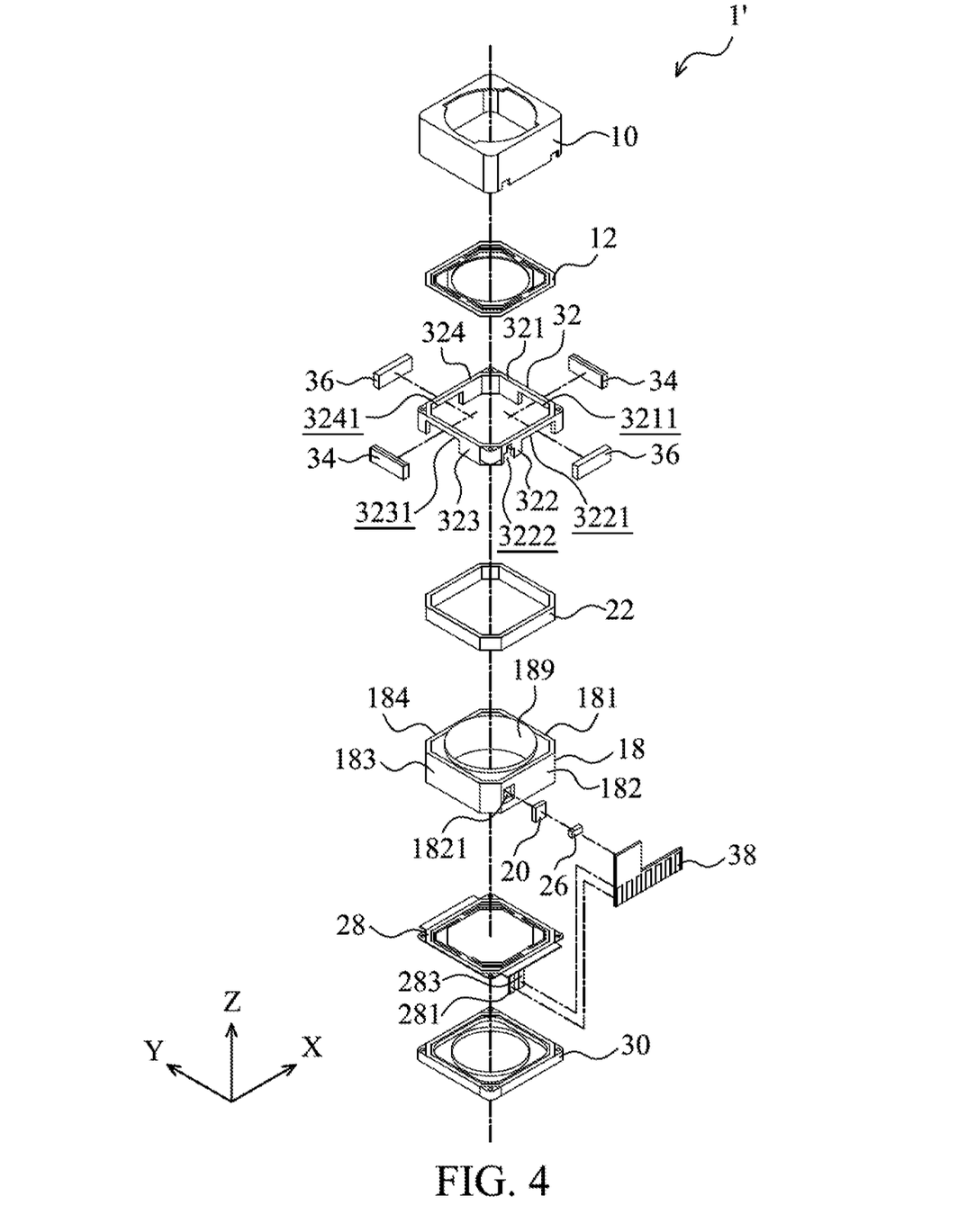
FIG. 4 shows an exploded view of an electromagnetic driving module, in accordance with some embodiments.

FIG. 4 shows an exploded view of an electromagnetic driving module 1'. In FIG. 4, elements similar to those of the electromagnetic driving module 1 are provided with the same reference numbers, and the features thereof are not repeated in the interest of brevity. Differences between the electromagnetic driving module 1' and the electromagnetic driving module 1 includes the electromagnetic driving module 1' including a frame 32, two first magnetic elements 34, two second magnetic elements 36, and a circuit board 38.

In one embodiment, the frame 32 is fixed at the upper housing 10 or the lower housing 30 and is positioned between the upper spring sheet 12 and the lower spring sheet 28. The frame 32 includes one or more side sub-frames. In one embodiment, the frame 32 includes four sub-frames, such as a first sub-frame 321, a second sub-frame 322, a third sub-frame 323, and a fourth sub-frame 324. In one embodiment, the first sub-frame 321, the second sub-frame 322, the third sub-frame 323, and the fourth sub-frame 324 are respectively adjacent to the first side surface 181, the second side surface 182, the third side surface 183, and the fourth side surface 184 of the base 18. A gap is formed between the sub-frame of the frame 32 and the outer surface of the base 18. There is no contact between the frame 32 and the base 18.

In one embodiment, each of the first sub-frame 321, the second sub-frame 322, the third sub-frame 323, and the fourth sub-frame 324 includes an opening, such as openings 3211, 3221, 3231, and 3241. The shape of each of the openings 3211 and 3231 corresponds to the shape of each first magnetic element 34, and the two first magnetic elements 34 are respectively positioned in the openings 3211 and 3231 and arranged adjacent to the wiring assembly 22. The shape of each of the openings 3221 and 3241 corresponds to the shape of each second magnetic element 36, and the two second magnetic elements 36 are respectively positioned in the openings 3221 and 3241 and arranged adjacent to the wiring assembly 22. In addition, the second sub-frame 322 further includes a through hole 3222, and the sensor element 26 is positioned in the through hole 3222.

Figure 5:
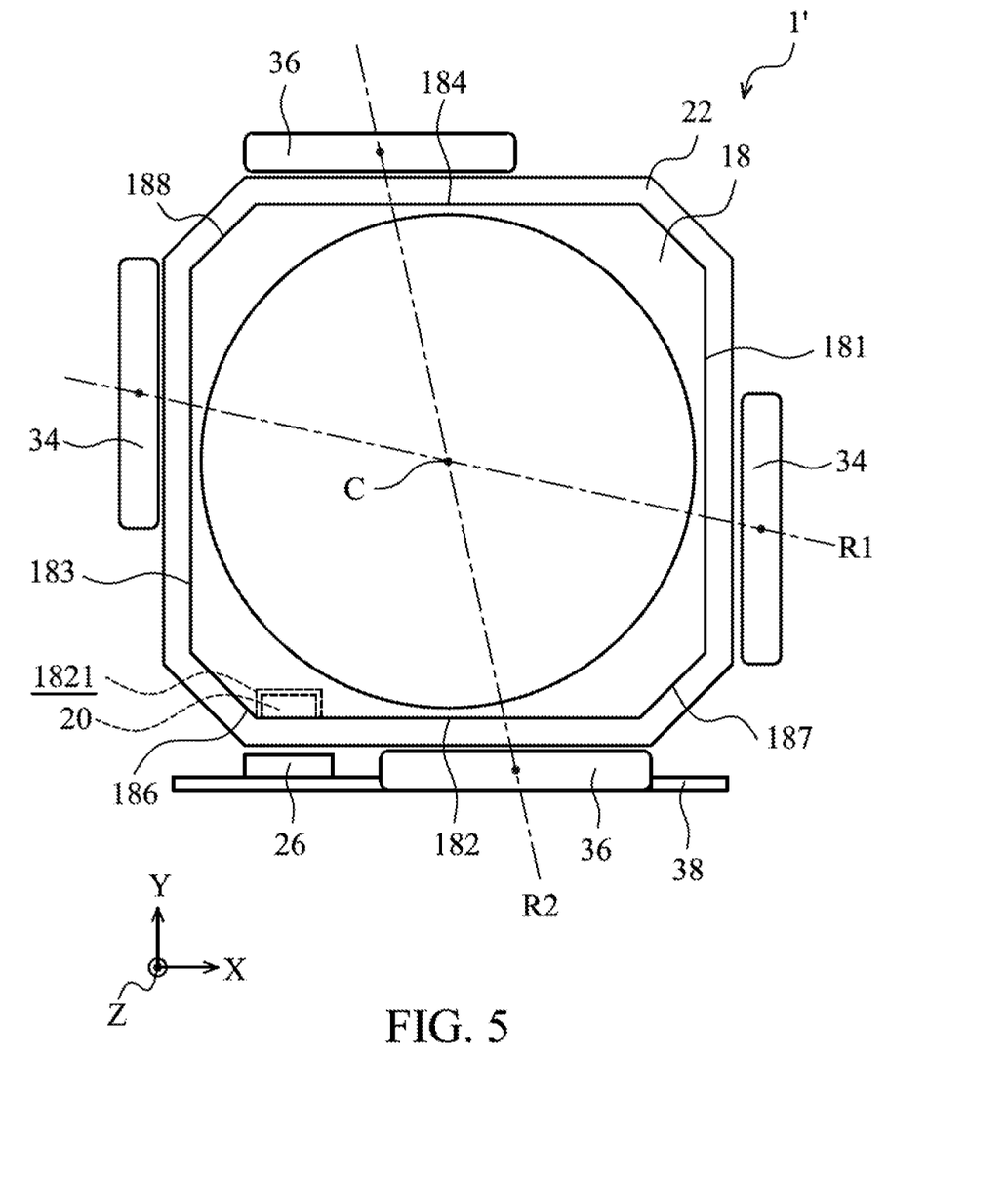
FIG. 5 shows a top view of a portion of an electromagnetic driving module, in accordance with some embodiments.

FIG. 5 shows a top view of a portion of the electromagnetic driving module 1'. As shown in FIG. 5, the central portion of each first magnetic element 34 is arranged on a first reference line R1, and the first reference line R1 passes through the substantially central portion of the base 18. In addition, the central portion of each second magnetic element 36 is arranged on a second reference line R2, and the second reference line R2 passes through the substantially central portion of the base 18. In one embodiment, the first reference line R1 and the second reference line R2 are located on the same plane. In one embodiment, the first magnetic element 34 arranged adjacent to the first side surface 181 and the second magnetic element 36 arranged adjacent to the second side surface 182 are at the corner 187 between the first side surface 181 and the second side surface 182. In addition, the first magnetic element 34 arranged adjacent to the third side surface 183 and the second magnetic element 36 arranged adjacent to the fourth side surface 184 are at the corner 188 between the third side surface 183 and the fourth side surface 184. Through the above-mentioned arrangements, in the operation of the electromagnetic driving module 1', the base 18 is able to be stably driven to move, and the control accuracy of the base 18 is improved.

In one embodiment, the two first magnetic elements 34 have the same magnetic field strength. The two second magnetic elements 36 have the same magnetic field strength. In one embodiment, the magnetic field strength of the two first magnetic elements 34 is different from the magnetic field strength of the two second magnetic elements 36. In one embodiment, the magnetic field strength of the two first magnetic elements 34 is the same as the magnetic field strength of the two second magnetic elements 36. Through the above-mentioned arrangements, the base 18 is driven to move by the magnetic force equally applied at two sides thereof to prevent tilting of the base 18.

In one embodiment, the circuit board 38 is arranged adjacent to the second side surface 182, and the second element 26 is arranged on the circuit board 38. In one embodiment, the circuit board 38 has an L-shape, and the second magnetic elements 36 are arranged adjacent to the circuit board 38, so as to reduce the size of the electromagnetic driving module 1'.

Figure 6:
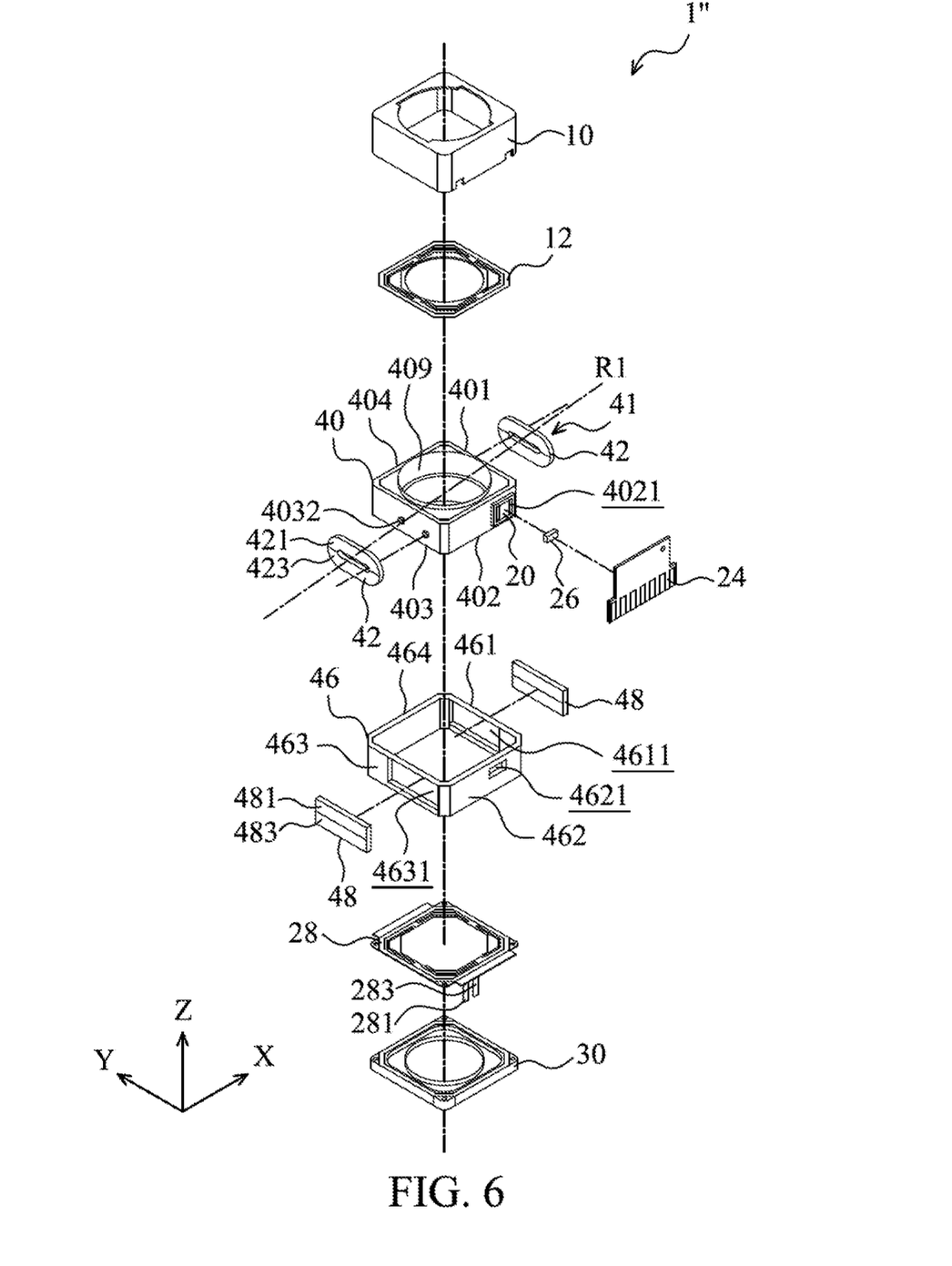
FIG. 6 shows an exploded view of an electromagnetic driving module, in accordance with some embodiments.

FIG. 6 shows an exploded view of an electromagnetic driving module 1". In FIG. 6, elements similar to those of the electromagnetic driving module 1 are provided with the same reference numbers, and the features thereof are not repeated in the interest of brevity. Differences between the electromagnetic driving module 1" and the electromagnetic driving module 1 includes the electromagnetic driving module 1" including a base 40, a wiring assembly 41, two first magnetic elements 42, and a frame 46.

In one embodiment, the base 40 is penetrated by a passage 409 and is configured to support an assembly, such as a lens assembly (not shown in FIG. 6). In addition, the base 40 includes one or more side surfaces surrounding the passage 409. In one embodiment, the base 40 includes a number of side surfaces, such as a first side surface 401, a second side surface 402, a third side surface 403, and a fourth side surface 404. The first side surface 401 is opposite to the third side surface 403, and the second side surface 402 is opposite to the fourth side surface 404. In addition, as shown in FIG. 6, the base 40 includes a number of positioning elements 4032 formed at the first side surface 401 and the third side surface 403 for fixing the wiring assembly 41.

The wiring assembly 41 includes two coils 42. The two coils 42 are respectively fixed on the first side surface 401 and the third side surface 403 of the base 40. Each of the two coils 42 includes an upper portion 421 and a lower portion 423 electrically connected to the upper portion 421. In one embodiment, the two coils 42 are electrically connected to the circuit board 24 via the lower spring sheet 28. When an electrical current from the outside is applied to each coil 42, the flow direction of the electrical current in the upper portion 421 is opposite to the flow direction of the electrical current in the lower portion 423. That is, the direction of the magnetic field generated by the upper portion 421 is opposite to the direction of the magnetic field generated by the lower portion 423.

In one embodiment, the frame 46 is fixed at the upper housing 10 or the lower housing 30 and is positioned between the upper spring sheet 12 and the lower spring sheet 28. The frame 46 includes one or more side sub-frames. In one embodiment, the frame 46 includes four sub-frames, such as a first sub-frame 461, a second sub-frame 462, a third sub-frame 463, and a fourth sub-frame 464. In one embodiment, the first sub-frame 461, the second sub-frame 462, the third sub-frame 463, and the fourth sub-frame 464 are respectively adjacent to the first side surface 401, the second side surface 402, the third side surface 403, and the fourth side surface 404 of the base 40. A gap is formed between the sub-frame of the frame 46 and the outer surface of the base 40. There is no contact between the frame 46 and the base 40.

In one embodiment, the first sub-frame 461 includes an opening 4611, and the third sub-frame 463 which is opposite to the first sub-frame 461 includes an opening 4631. The shape of each of the openings 4611 and 4631 corresponds to the shape of each first magnetic element 48. The two first magnetic elements 48 are arranged adjacent to wiring assembly 22 and respectively positioned in the openings 4611 and 4631. In addition, the second sub-frame 462 further includes a through hole 4621, and the sensor element 26 is disposed in the through hole 4621.

In one embodiment, each of the two first magnetic elements 48 includes an upper magnetic pole 481 and a lower magnetic pole 483. The upper magnetic pole 481 is adjacent to the upper portion 421, and the lower magnetic pole 483 is adjacent to the lower portion 423. At one side of each of the two first magnetic elements 48 that faces to the coil 42, the upper magnetic pole 481 and the lower magnetic pole 483 have different magnetic properties. For example, at one side of the first magnetic element 48 that faces the coil 42, the upper magnetic pole 481 has a north magnetic polarity, and the lower magnetic pole 483 has a south magnetic polarity. In one embodiment, since the circular wiring assembly 22 (FIG. 1) is replaced by the two coils 42, the size of the electromagnetic driving module 1" is reduced.

Figure 7:
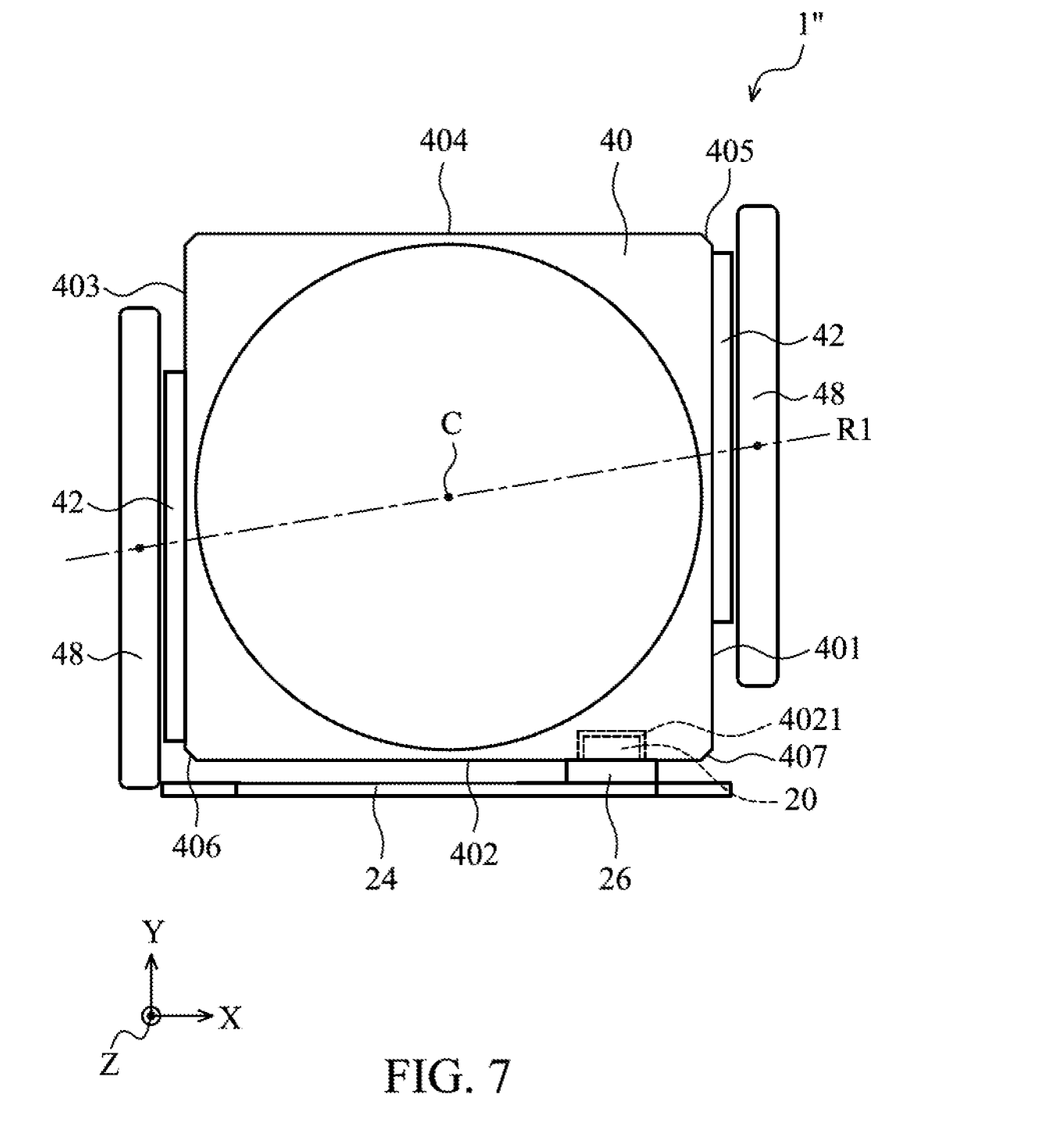
FIG. 7 shows a top view of a portion of an electromagnetic driving module, in accordance with some embodiments.

FIG. 7 shows a top view of part of the electromagnetic driving module 1". As shown in FIG. 7, the substantial central portion of each first magnetic element 16 is arranged along a first reference line R1. The first reference line R1 passes through the substantial central portion of the base 40, but the first reference line R1 is not perpendicular to the first side surface 401 and the third side surface 403. That is, one of the first magnetic elements 48 is adjacent to a corner 405 between the first side surface 401 and the fourth side surface 404, and the other first magnetic element 48 is adjacent to a corner 405 between the second side surface 402 and the third side surface 403. Through the above-mentioned arrangements, in the operation of the electromagnetic driving module 1", the base 40 is able to be stably driven to move, and the control accuracy of the base 40 is improved. However, the position of the two first magnetic elements 48 should not be limited to the embodiment. The position of the two first magnetic elements 48 can be modified as long as the base 40 can be stably driven to move.

In one embodiment, at a corner 407 between the first side surface 401 and the second side surface 402 of the base 40, an accommodation groove 4021 is formed on the second side surface 402 of the base 40. The reference element 20 corresponds to the sensor element 26 and is positioned in the accommodation groove 4021.

In the present disclosure, with the sensor element, the position of the base of the electromagnetic driving module can be instantly analyzed by a control system. Therefore, the control precision is improved. In addition, since the electromagnetic driving module is connected to an outside circuit via the circuit board, the processing time for assembling the electromagnetic driving module and the other element (such as a motherboard) is decreased. Therefore, production efficiency is improved and the manufacturing cost is reduced.

While the disclosure has been described by way of example and in terms of preferred embodiment, it is to be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements

What is claimed is:

1. An electromagnetic driving module, comprising:
   a base, comprising:
      a passage;
      a first side surface;
      a second side surface; and
      a third side surface, wherein the first, second and third side surfaces surround the passage, and the first side surface is opposite to the third side surface;
   a first magnetic element, disposed on a side of the base;
   a coil, fixed on the first side surface and adjacent to the first magnetic element, wherein when an electric current passes through the coil, the base is driven by the first magnetic element and the coil to move along a first direction;
   a reference element, disposed in an accommodation groove formed on the second side surface; and
   a sensor element, detecting the reference element to determine the position of the base.

2. The electromagnetic driving module as claimed in claim 1, wherein the sensor element is configure to detect the variation of the magnetic field.

3. The electromagnetic driving module as claimed in claim 1, wherein the coil comprises an upper portion and a lower portion, and when the electrical current is applied to the coil, the flow direction of the electrical current in the upper portion is opposite to the flow direction of the electrical current in the lower portion.

4. The electromagnetic driving module as claimed in claim 3, wherein the first magnetic element comprises an upper magnetic pole and a lower magnetic pole, at the surface of the first magnetic element facing the coil, the upper magnetic pole has a north magnetic polarity, and the lower magnetic pole has a south magnetic polarity.

5. The electromagnetic driving module as claimed in claim 1, wherein the reference element is disposed at a corner between the first side surface and the second side surface.

6. The electromagnetic driving module as claimed in claim 1, wherein the electromagnetic driving module further comprises:
   a housing; and
   a frame, disposed in the housing and having a first sub-frame and a second sub-frame, wherein the first magnetic element is disposed in an opening of the first sub-frame, and the sensor element is disposed in a hole of the second sub-frame.

7. The electromagnetic driving module as claimed in claim 1, wherein the electromagnetic driving module further comprises an another coil and an another first magnetic element, the another coil is disposed on the third side surface, and the another first magnetic element corresponds to the another coil.

8. The electromagnetic driving module as claimed in claim 7, wherein the electromagnetic driving module further comprises:
- a housing; and
- a frame, disposed in the housing and having a first sub-frame, a second sub-frame, and a third sub-frame, wherein the first magnetic element is disposed in an opening of the first sub-frame, the sensor element is disposed in a hole of the second sub-frame, and the another first magnetic element is disposed in another opening of the third sub-frame.

9. The electromagnetic driving module as claimed in claim 1, wherein the electromagnetic driving module further comprises a circuit board, and the sensor element is disposed on and electrically connected to the circuit board.

10. The electromagnetic driving assembly as claimed in claim 9, wherein the electromagnetic driving assembly further comprises a spring sheet, and the coil is electrically connected to the circuit board via the spring sheet.

11. An electromagnetic driving module, comprising:
- a base, comprising:
  - a passage;
  - a first side surface;
  - a second side surface; and
  - a third side surface, wherein the first, second and third side surfaces surround the passage, and the first side surface is opposite to the third side surface;
- a first magnetic element, disposed on a side of the base;
- a coil, fixed on the first side surface and adjacent to the first magnetic element, wherein when an electric current passes through the coil, the base is driven by the first magnetic element and the coil to move along a first direction;
- a reference element, disposed in an accommodation groove formed on the second side surface; and
- a sensor element, corresponding to the reference element and configured to detect the movement of the reference element, wherein the sensor element is not in contact with the base.

* * * * *